(12) United States Patent
Mohtar et al.

(10) Patent No.: US 10,570,905 B2
(45) Date of Patent: Feb. 25, 2020

(54) CENTRIFUGAL COMPRESSOR FOR A TURBOCHARGER, HAVING SYNERGISTIC PORTED SHROUD AND INLET-ADJUSTMENT MECHANISM

(71) Applicant: Honeywell International Inc., Morris Plains, NJ (US)

(72) Inventors: Hani Mohtar, Chaumousey (FR); Stephane Pees, Ceintrey (FR); William Joseph Smith, Gardena, CA (US); Junfei Yin, Bedford (GB)

(73) Assignee: Garrett Transportation I Inc., Torrance, CA (US)

( * ) Notice: Subject to any disclaimer, the term of this patent is extended or adjusted under 35 U.S.C. 154(b) by 232 days.

(21) Appl. No.: 15/675,691

(22) Filed: Aug. 11, 2017

(65) Prior Publication Data
US 2019/0048876 A1 Feb. 14, 2019

(51) Int. Cl.
*F04D 29/28* (2006.01)
*F04D 17/10* (2006.01)
(Continued)

(52) U.S. Cl.
CPC ........... *F04D 17/10* (2013.01); *F02B 37/22* (2013.01); *F02C 6/12* (2013.01); *F02C 7/042* (2013.01);
(Continued)

(58) Field of Classification Search
CPC ............................................. F05B 2270/1081
See application file for complete search history.

(56) References Cited

U.S. PATENT DOCUMENTS

| 4,122,668 A | 10/1978 | Chou et al. |
| 6,896,240 B2 * | 5/2005 | Wijaya ............... F02D 9/18 251/212 |

(Continued)

FOREIGN PATENT DOCUMENTS

| DE | 102010026176 A1 | 1/2012 |
| DE | 102011121996 B4 | 6/2013 |

(Continued)

OTHER PUBLICATIONS

EPO Search Report and Opinion for EP Appl. No. 18188007.1-1007, dated Dec. 17, 2018.

*Primary Examiner* — Dwayne J White
*Assistant Examiner* — Jason G Davis
(74) *Attorney, Agent, or Firm* — John C. James

(57) ABSTRACT

A centrifugal compressor for a turbocharger includes an inlet-adjustment mechanism in an air inlet for the compressor, operable to move between a closed position, an open position, and a super-open position. The compressor also includes a ported shroud system. The inlet-adjustment mechanism includes a plurality of blades disposed about the air inlet and movable radially inwardly and outwardly for defining the various positions. In the closed position, the effective diameter of air inlet is reduced and the blades block flow through the ported shroud system. In the open position, the blades still block the ported shroud but the effective inlet diameter is increased relative to the closed position. In the super-open position, the blades unblock the ported shroud so that an additional amount of flow can pass through the ported shroud, thereby shifting the compressor's choke flow line to higher flow rates.

5 Claims, 12 Drawing Sheets

(51) Int. Cl.
*F04D 29/46* (2006.01)
*F04D 27/02* (2006.01)
*F02B 37/22* (2006.01)
*F02C 7/042* (2006.01)
*F02C 6/12* (2006.01)
*F04D 29/42* (2006.01)
*F04D 29/68* (2006.01)

(52) U.S. Cl.
CPC ..... *F04D 27/0207* (2013.01); *F04D 27/0253* (2013.01); *F04D 29/284* (2013.01); *F04D 29/287* (2013.01); *F04D 29/4213* (2013.01); *F04D 29/4226* (2013.01); *F04D 29/462* (2013.01); *F04D 29/464* (2013.01); *F04D 29/685* (2013.01); *F05D 2220/40* (2013.01); *F05D 2250/51* (2013.01)

(56) References Cited

U.S. PATENT DOCUMENTS

| | | | |
|---|---|---|---|
| 9,528,527 B2 * | 12/2016 | Sekularac | F04D 29/4213 |
| 9,719,518 B2 | 8/2017 | Mohtar et al. | |
| 2009/0060708 A1 | 3/2009 | Hale | |
| 2014/0308110 A1 * | 10/2014 | Houst | F02B 37/22 |
| | | | 415/1 |

FOREIGN PATENT DOCUMENTS

| | | |
|---|---|---|
| DE | 102015111462 B3 | 9/2016 |
| EP | 1947299 A2 | 7/2008 |
| EP | 3018356 A1 | 11/2016 |
| JP | 3719337 B2 | 9/2005 |
| WO | 2013074503 A1 | 5/2013 |

* cited by examiner

CENTRIFUGAL COMPRESSOR FOR A TURBOCHARGER, HAVING SYNERGISTIC PORTED SHROUD AND INLET-ADJUSTMENT MECHANISM

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

Choked flow can also occur in the compressor at high flow rates. It would be desirable to have a means for shifting the choke line to higher flow rates when operating conditions require it.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio) and for the choke flow line to be shifted to the right (i.e., choke flow increases to a higher flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a shroud surface that is adjacent to and follows a radially outer contour of the compressor wheel;

a compressor inlet-adjustment mechanism disposed in the air inlet of the compressor housing and movable between a closed position and a super-open position, the inlet-adjustment mechanism comprising a plurality of blades that are distributed about a circumference of the air inlet and that collectively form a ring that delimits an orifice, the blades being movable generally radially inwardly to define the closed position, and being movable generally radially outwardly to define the super-open position; and wherein the compressor housing defines a ported shroud system comprising an inner wall forming an upstream extension of the shroud surface, and an outer wall spaced radially outwardly of the inner wall such that an annular space is defined between the inner and outer walls, and a bleed port formed through the inner wall and located adjacent the inducer portion of the compressor wheel for allowing air to pass between the annular space and the inducer portion, the inner wall extending upstream from the compressor wheel and terminating at an upstream edge, an opening into the annular space being defined between the outer wall and the upstream edge of the inner wall, wherein the blades of the inlet-adjustment mechanism are arranged such that in the closed position the blades block the opening into the annular space and prevent air flow into the annular space, the orifice in the closed position having a smaller diameter than that delimited by the inner wall, and in the super-open position the blades unblock the opening and allow air to flow into the annular space and through the bleed port into the compressor wheel.

In one embodiment, the inlet-adjustment mechanism is adjustable to an open position that is intermediate the closed and super-open positions and in which the blades still block the opening into the annular space. The orifice in the open position can have a diameter approximately equal to that delimited by the inner wall.

At low to intermediate engine speeds (and correspondingly low compressor speeds) the inlet-adjustment mechanism can be placed in the closed position in which ported shroud is closed and the effective inlet diameter is reduced, thereby shifting the compressor surge line to the left on the compressor map and improving low-flow efficiency.

At higher engine speeds (and correspondingly high compressor speeds), the inlet-adjustment mechanism can be moved to the super-open position in which the ported shroud is open and such that the choked flow line is shifted to the right on the compressor map.

At intermediate operating conditions in which neither choked flow nor surge are of concern, the inlet-adjustment mechanism can be placed in the open position. In the open position, the compressor is configured as if it were an ordinary compressor having no inlet-adjustment mechanism or ported shroud system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as moving "radially" inwardly or outwardly, the term "radially" does not preclude some non-radial component of movement of the blades (for example, the blades may occupy a plane that is angled slightly with respect to the rotational axis of the compressor, such that when the blades move radially inwardly and outwardly, they also move with a small axial component of motion). Movement of the blades may also include some circumferential component of motion in addition to the radial component.

Figure 1:
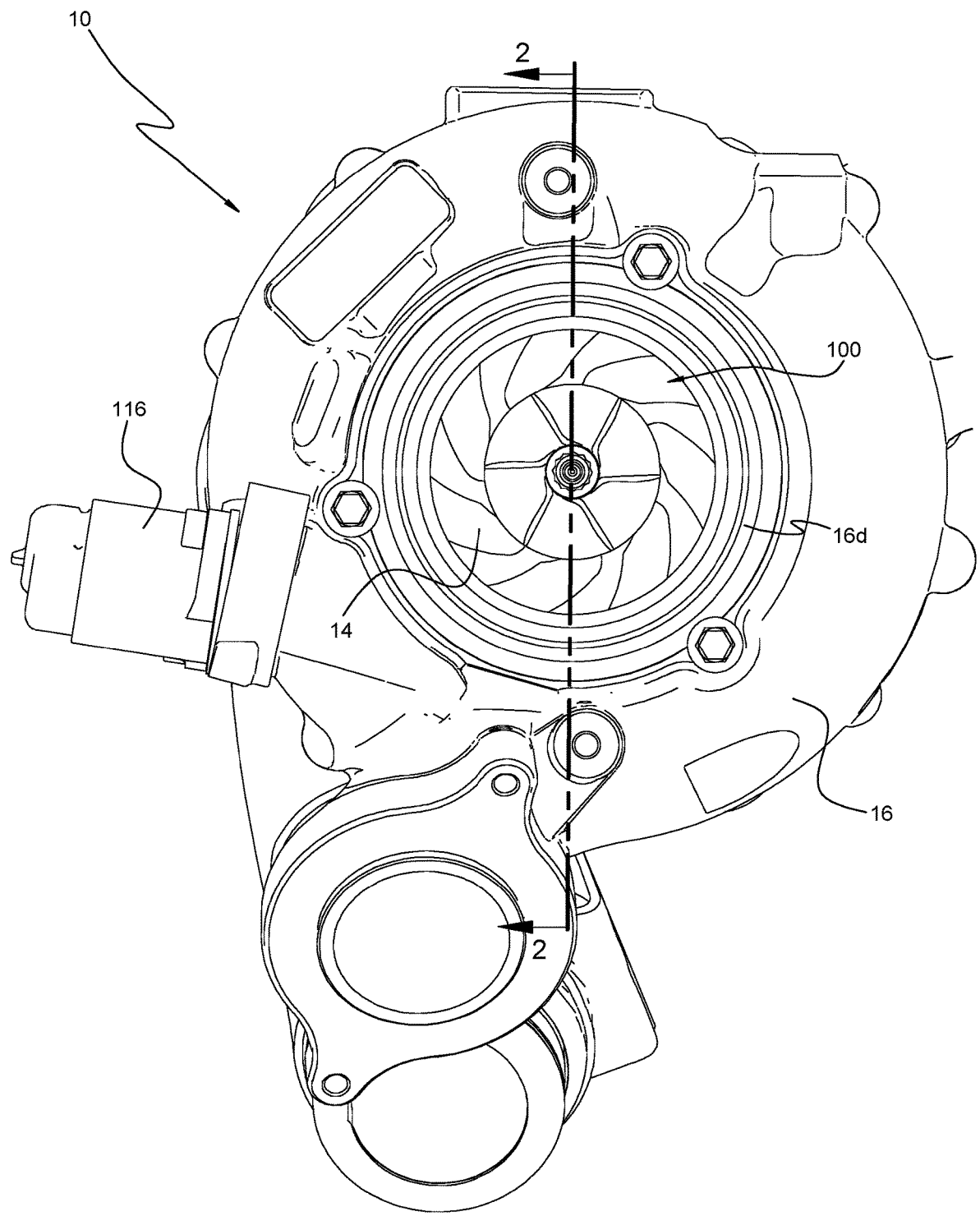
FIG. 1 is an end view of a turbocharger in accordance with one embodiment of the invention, looking axially from the compressor end toward the turbine end of the turbocharger, with the inlet-adjustment mechanism in a fully closed position.
Figure 2:
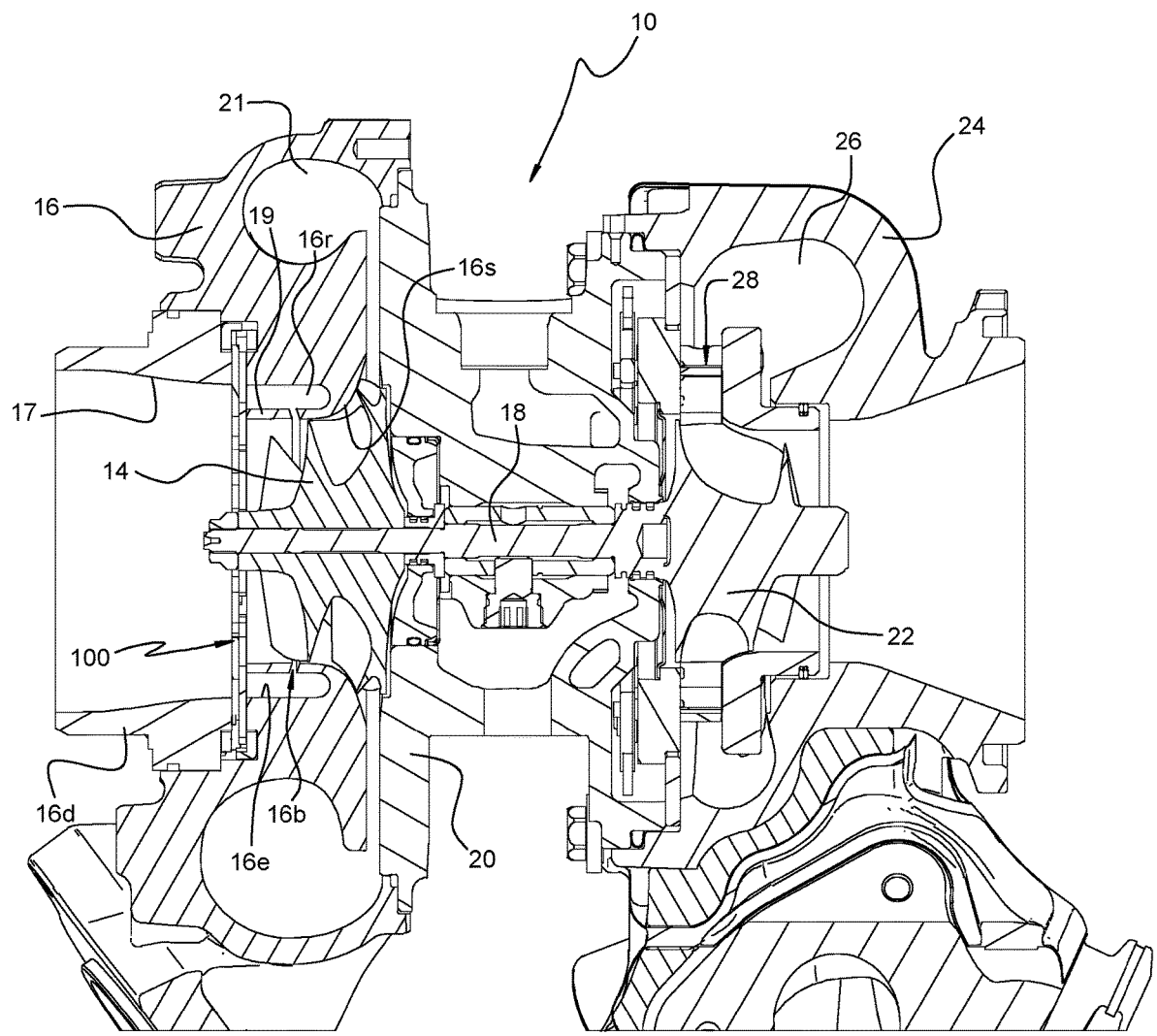
FIG. 2 is a cross-sectional view of the turbocharger along line 2-2 in FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

Figure 3:
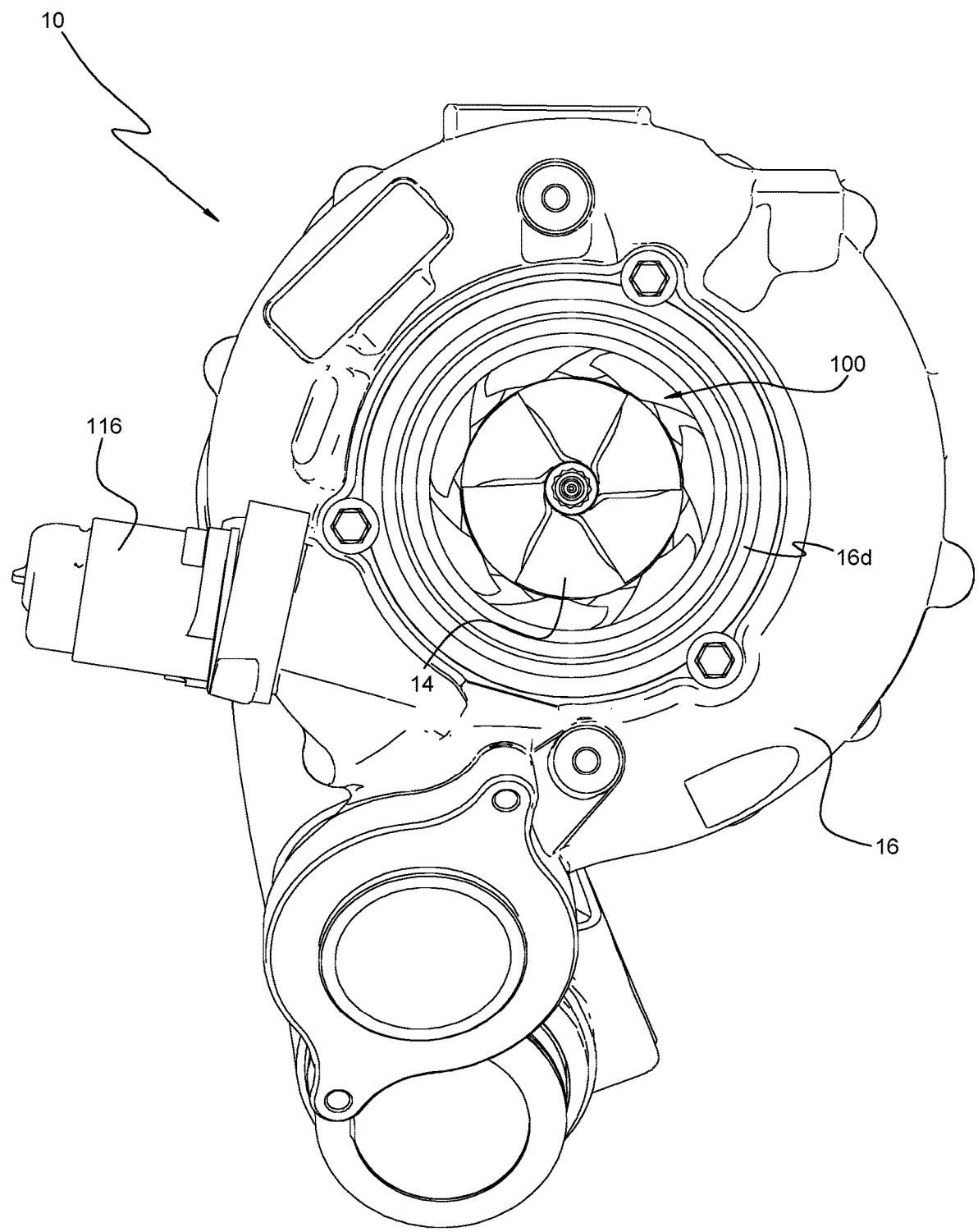
FIG. 3 is a view similar to FIG. 1, with the inlet-adjustment mechanism in an open position.

With reference to FIGS. 1-3, in the illustrated embodiment, the wall that defines the air inlet 17 is formed in part by the compressor housing 16 and in part by a separate inlet duct member 16d that is received into a cylindrical receptacle defined by the compressor housing.

The compressor housing 16 defines a shroud surface 16s that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16*d*. The inlet-adjustment mechanism is operable for adjusting an effective diameter of the air inlet into the compressor wheel. As such, the inlet-adjustment mechanism is movable between an open position and a closed position, and can be arranged to be adjusted to various intermediate positions between said open and closed positions.

The present invention can be practiced with various types of inlet-adjustment mechanisms having blades or vanes or ring segments that are distributed about a circumference of the air inlet and that collectively form a ring that circumscribes an orifice (which can be circular or non-circular) whose diameter can be adjusted to various sizes for regulating flow into the compressor. Thus, the blades or vanes or ring segments (any of which hereafter will be called generally "blades") are movable generally radially inwardly and outwardly for adjusting the orifice size. As non-limiting examples, the present invention can be practiced with the inlet-adjustment mechanism described in any of the following commonly owned U.S patent applications of Applicant's: Ser. No. 14/642,825 filed on Mar. 10, 2015; Ser. No. 14/551,218 filed on Sep. 9, 2015; Ser. No. 15/446,054 filed on Mar. 1, 2017; Ser. No. 15/446,090 filed on Mar. 1, 2017; and Ser. No. 15/456,403 filed on Mar. 10, 2017. The entire disclosures of the above applications are hereby incorporated herein by reference.

With reference now to FIGS. 6 through 9, the inlet-adjustment mechanism comprises a plurality of first blades 102A arranged about the central axis of the air inlet and each pivotable about a first pivot pin 104A located at or near one end of the blade, and a plurality of second blades 102B arranged about the central axis and each pivotable about a second pin (not visible in the drawings) located at or near one end of the blade. The first blades 102A lie in a first plane, and the second blades 102B lie in a second plane parallel and axially adjacent to the first plane. Each first blade 102A includes a projection 105A located radially outwardly of the first pivot pin 104A, and similarly each second blade includes a projection 105B located radially outwardly of the second pivot pin. A first unison ring 106A defines a plurality of circumferentially spaced slots or recesses 107A that receive the projections 105A of the first blades, and similarly a second unison ring 106B includes recesses 107B that receive the projections 105B of the second blades. The inlet-adjustment mechanism can comprise a cartridge that includes a pair of annular end plates 101, 109 (FIG. 2A) that are spaced apart axially, with the unison rings and first and second blades being disposed in the axial space between the end plates. The first pivot pins 104A can be received in recesses defined in the adjacent end plate 101 and correspondingly the second pivot pins can be received in recesses defined in the other end plate 109. In an alternative non-cartridge form of the mechanism, the recesses for the blade pivot pins can be defined in portions of the compressor housing assembly. In any case, the blade pivot pins are fixed in position so that when the unison rings 106A,B are rotated about the axis of the inlet-adjustment mechanism, the blades 102A,B pivot about their pivot pins because of the engagement of the projections 105A,B in the recesses 107A,B of the unison rings.

While the illustrated embodiment employs two sets of blades 102A and 102B, a single set of blades, or more than two sets of blades, can be employed in a similar fashion.

As shown in FIG. 2, the entire assembly of the inlet-adjustment mechanism 100 is disposed in an annular space defined between the compressor housing 16 and the inlet duct member 16*d*. The blades 102A,B are arranged to pass through the slot in the inlet wall that effectively results from the provision of this annular space.

While the illustrated embodiment includes two unison rings for the two sets of blades, alternatively a single unison ring can be employed (whether the mechanism includes a single set of blades or multiple sets of blades).

Figure 5:
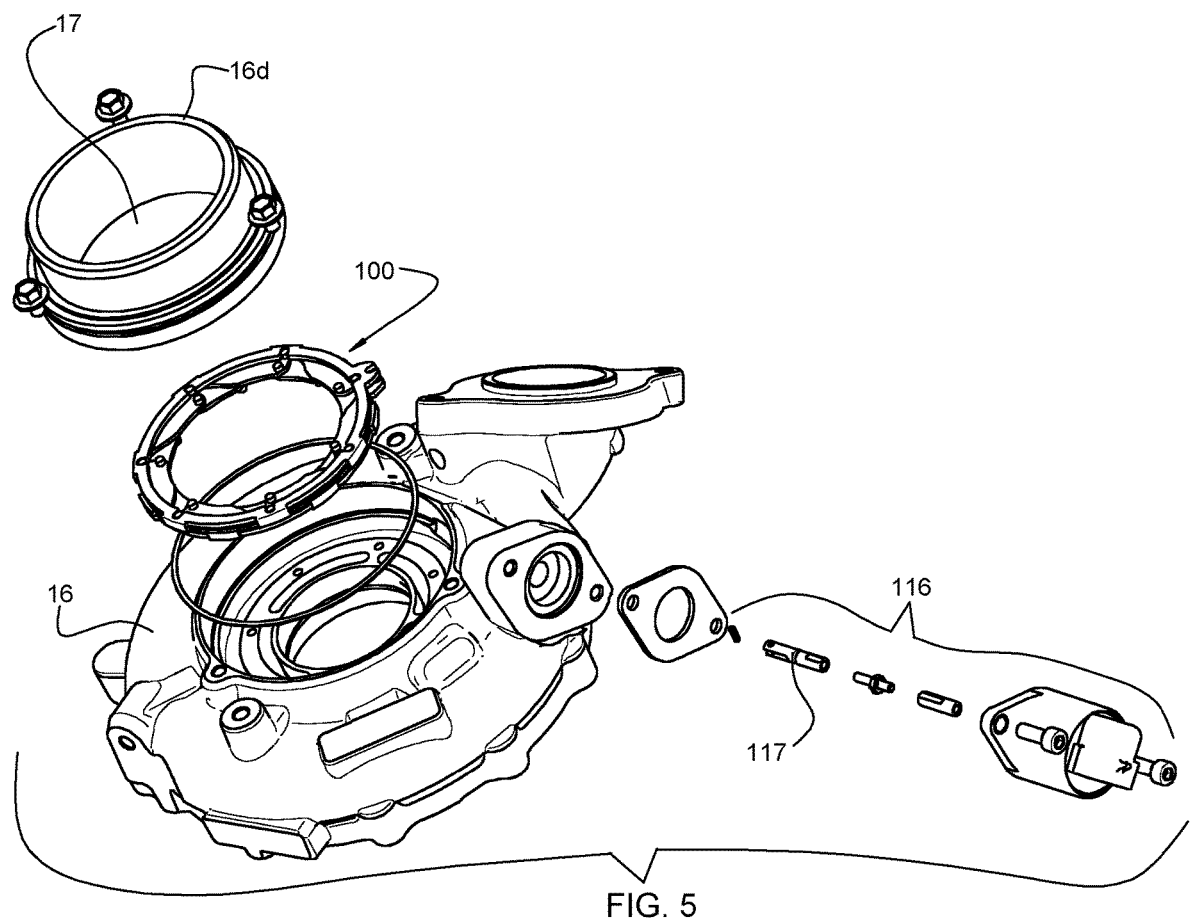
FIG. 5 is an exploded view of the compressor housing assembly for the turbocharger of FIG. 1.
Figure 6:
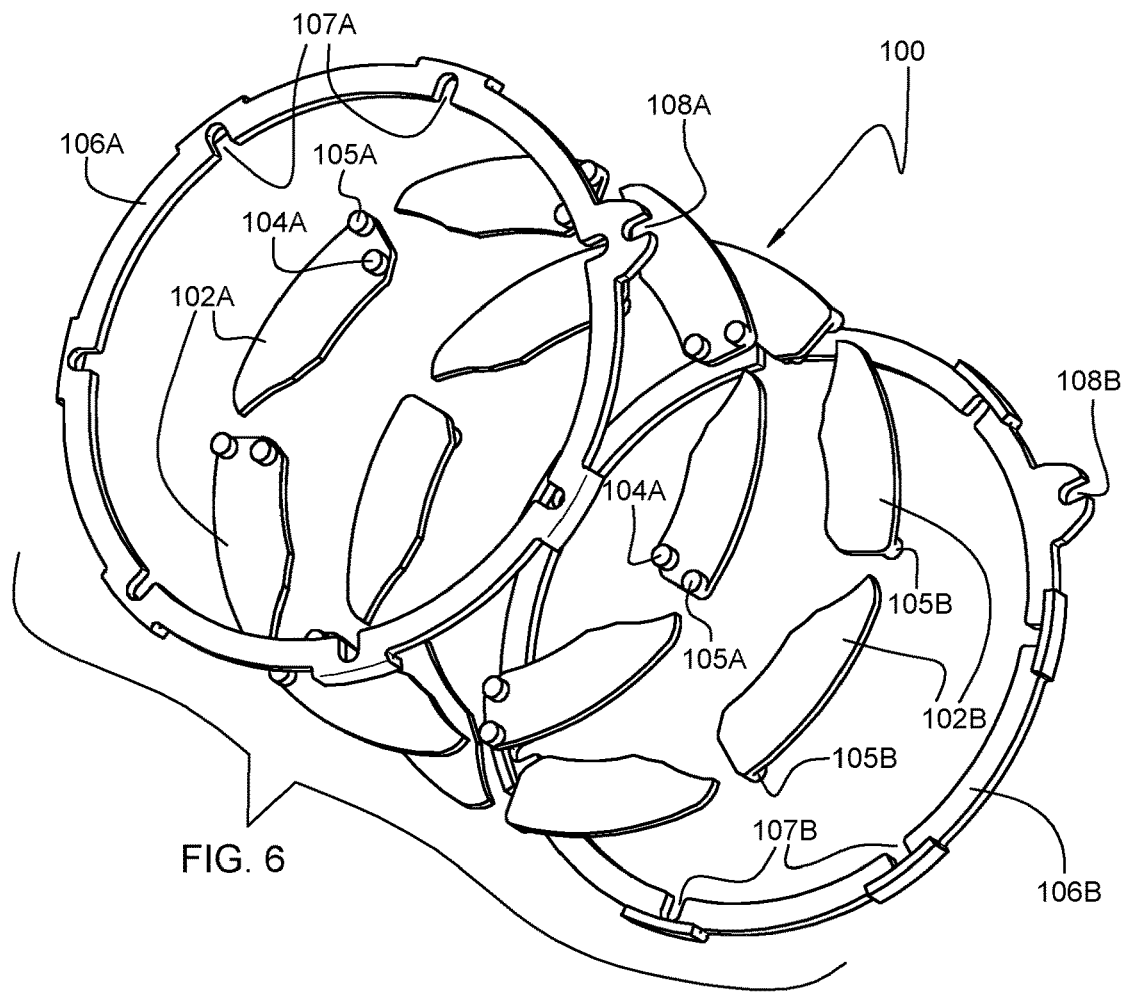
FIG. 6 is an exploded view of the inlet-adjustment mechanism.

The inlet-adjustment mechanism is actuated by an actuator 116 (FIG. 5) having an actuator rod 117 that extends through a passage defined in the compressor housing 16 and is connected to a fork 108A on the first unison ring 106A and a fork 108B on the second unison ring 106B (FIG. 6). Extension of the actuator rod rotates the unison rings in one direction, and retraction of the rod rotates them in the other direction.

The compressor housing 16 also defines ported shroud system effective for increasing the mass flow rate of the compressor at choke conditions (i.e., for moving the choke flow line to higher flow rates on the map of pressure ratio versus flow for the compressor). More particularly, with reference to FIG. 2, the ported shroud is defined by an inner wall 19 of the compressor housing 16 that is effectively an upstream extension of the shroud surface 16*s*, at the same radius from the compressor axis. The inner wall 19 is spaced radially inwardly from an outer wall 16*e* that is effectively a downstream extension of the inner surface of the air inlet 17 defined by the inlet duct member 16*d*, such that there is an annular space or passage 16*r* defined between the inner wall 19 and the outer wall 16*e* of the air inlet. The inner wall 19 can be joined to the outer wall 16*e* by a plurality of circumferentially spaced struts 23 or the like (see FIG. 4). The inner wall 19 defines one or more bleed ports 16*b* located in the inducer region of the compressor wheel 14. The bleed port can be a single circumferentially continuous slot that extends 360 degrees about the circumference of the wall, or can be a series of ports circumferentially spaced about the circumference. The bleed port 16*b* connects the inducer region of the compressor wheel with the annular space 16*r*.

The inner wall 19 extends in the upstream direction from the inducer of the wheel and terminates at an upstream edge. In the embodiment shown in FIG. 2, the upstream edge of the inner wall 19 is spaced by a very small clearance from the inlet-adjustment mechanism 100. Alternatively, however, the clearance can be larger than shown.

Figure 2A:
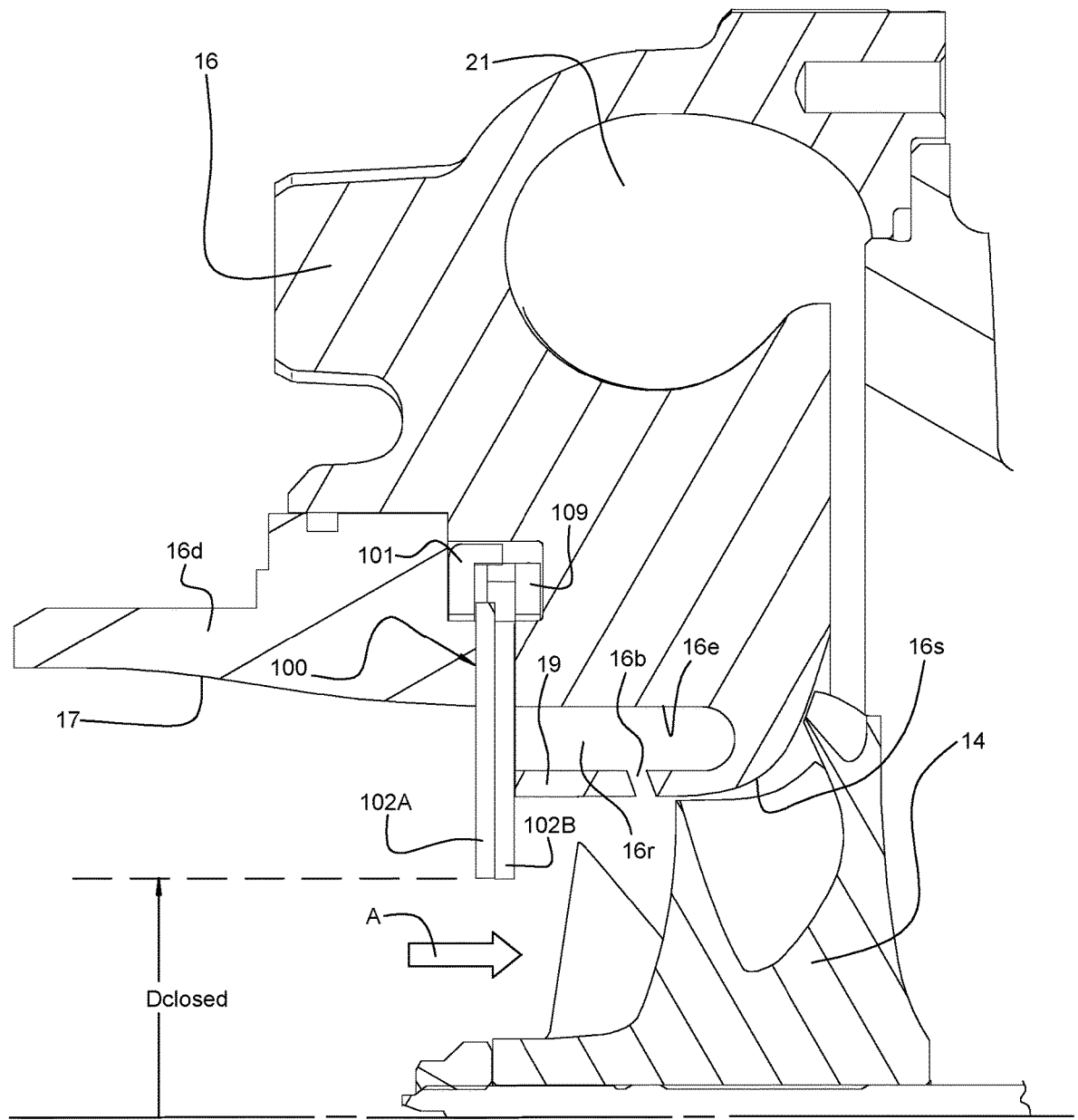
FIG. 2A is an enlarged portion of FIG. 2.

The inlet-adjustment mechanism 100 and the ported shroud system work in synergism with each other, as now explained with reference to FIGS. 2A, 3A, and 4A. FIG. 2A shows the inlet-adjustment mechanism in the closed position (see also the corresponding axial end view in FIG. 1, and the isolated view of the inlet-adjustment mechanism in FIG. 9). In the closed position, the blades of the inlet-adjustment mechanism are moved radially inwardly to their maximum extent, and they close off the annular space 16*r* of the ported shroud system. Accordingly, when the inlet-adjustment mechanism is fully closed, the effective diameter Dclosed of the air inlet is defined by the reduced-diameter orifice dictated by the closed blades 102A,B of the inlet-adjustment mechanism. As indicated by the arrow A in FIG. 2A, airflow is restricted to the region delimited by the reduced-diameter Dclosed.

Figure 3A:
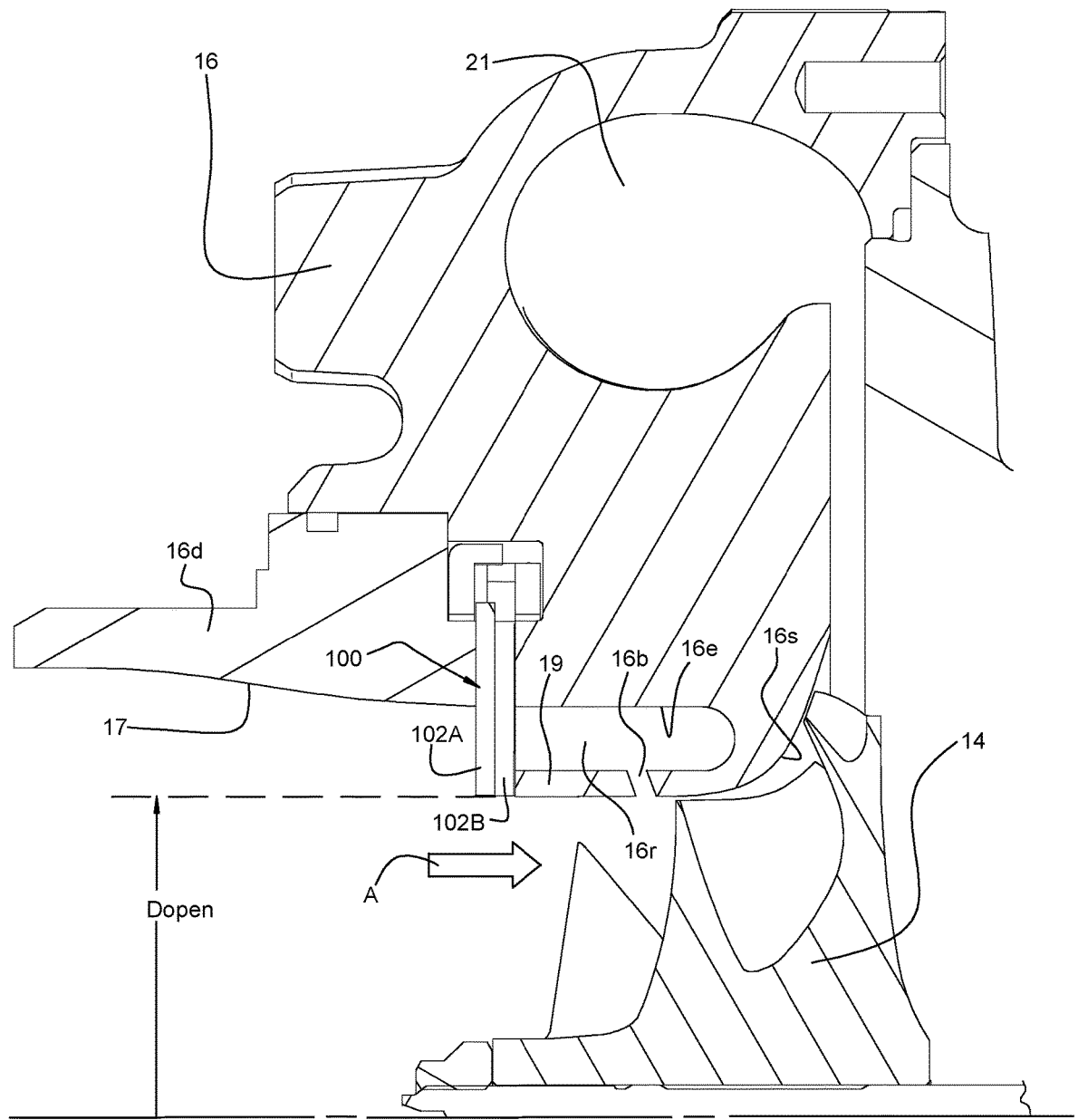
FIG. 3A is a view similar to FIG. 2A, with the inlet-adjustment mechanism in the open position.
Figure 8:
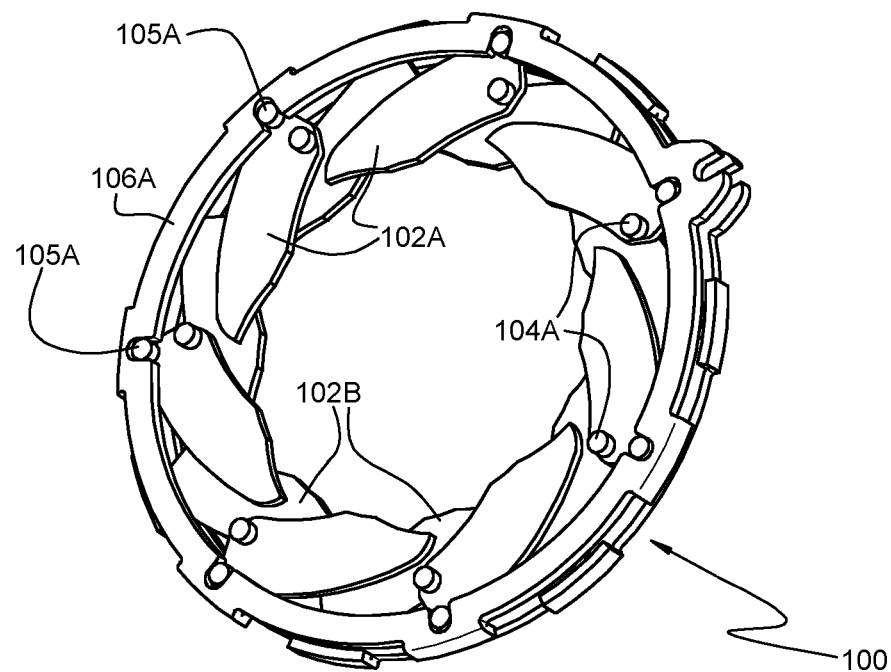
FIG. 8 is an isometric view of the inlet-adjustment mechanism in the open position.
Figure 9:
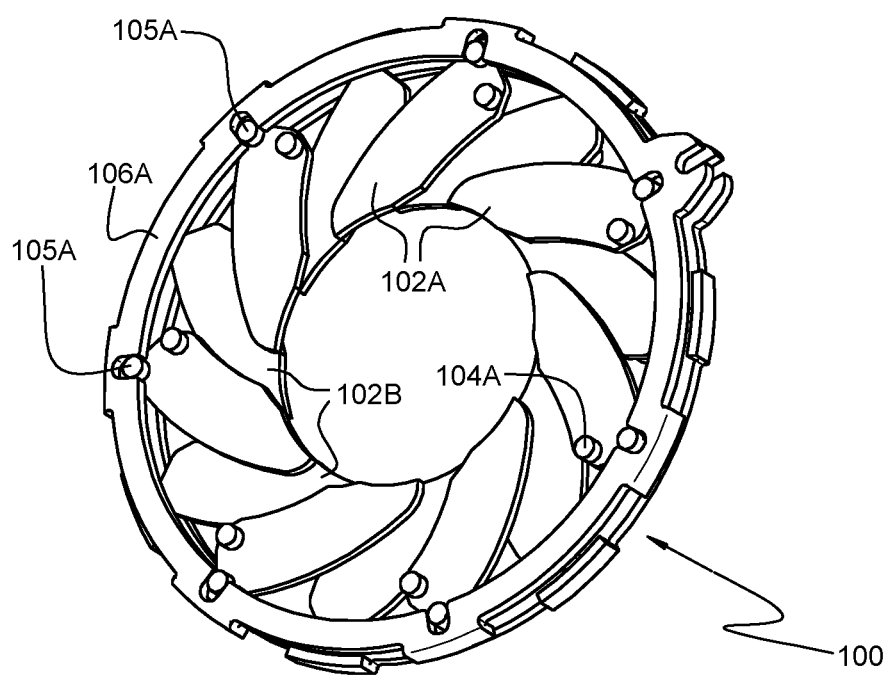
FIG. 9 is an isometric view of the inlet-adjustment mechanism in the closed position.

FIG. 3A depicts the inlet-adjustment mechanism in the open position (see also the corresponding axial end view in FIG. 3 and the isolated view of the mechanism in FIG. 8).

In the open position, the blades 102A,B are moved radially outwardly until the orifice they delimit is at least as large as the inner diameter of the inner wall 19, but while still closing off the annular space 16r of the ported shroud system. Thus, air is prevented from flowing through the annular space 16r. In this open position, airflow (see arrow A) is restricted to the region delimited by the diameter Dopen, which preferably corresponds to the inner diameter of the inner wall 19.

Figure 4:
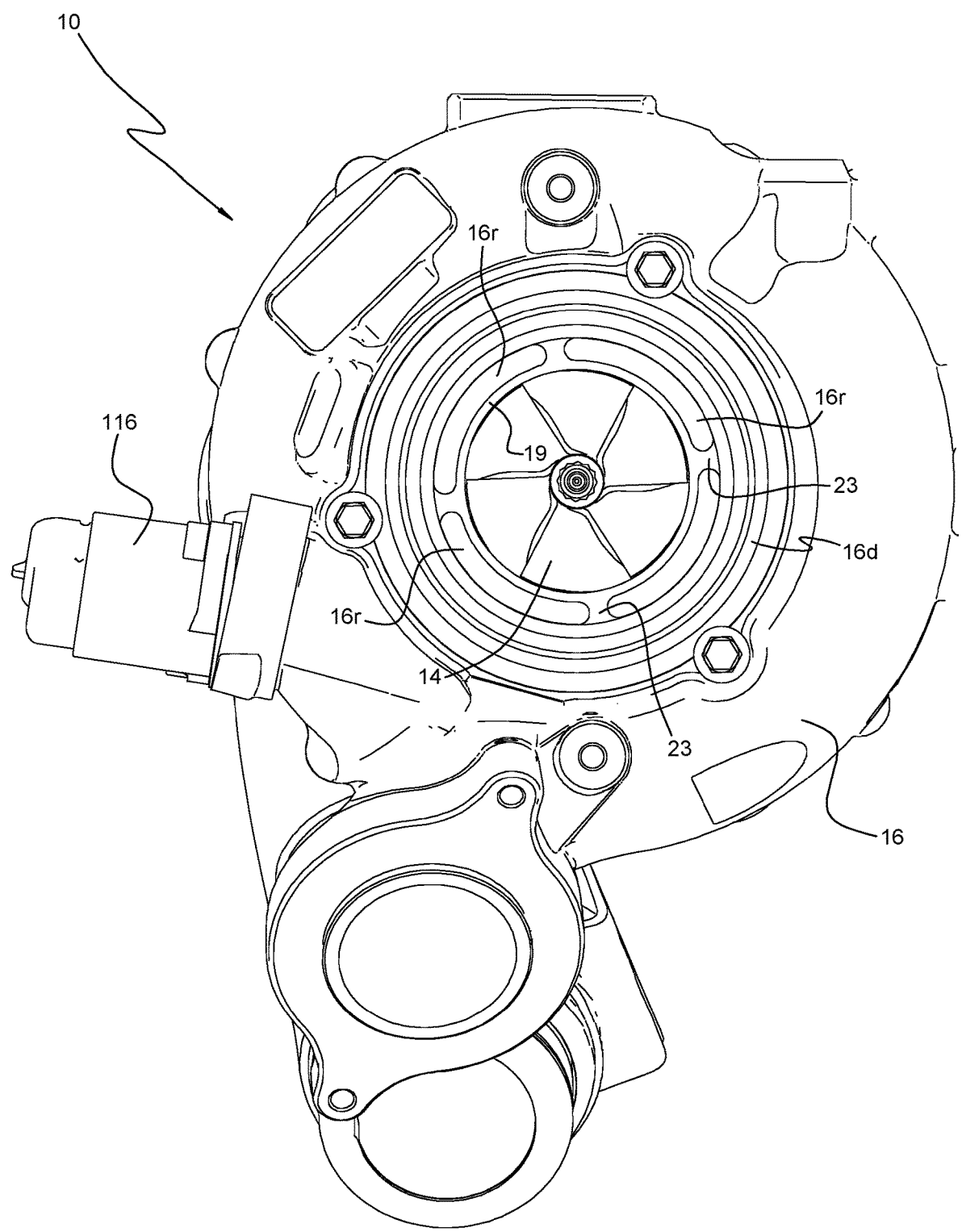
FIG. 4 is a view similar to FIG. 1, with the inlet-adjustment mechanism in a super-open position.
Figure 4A:
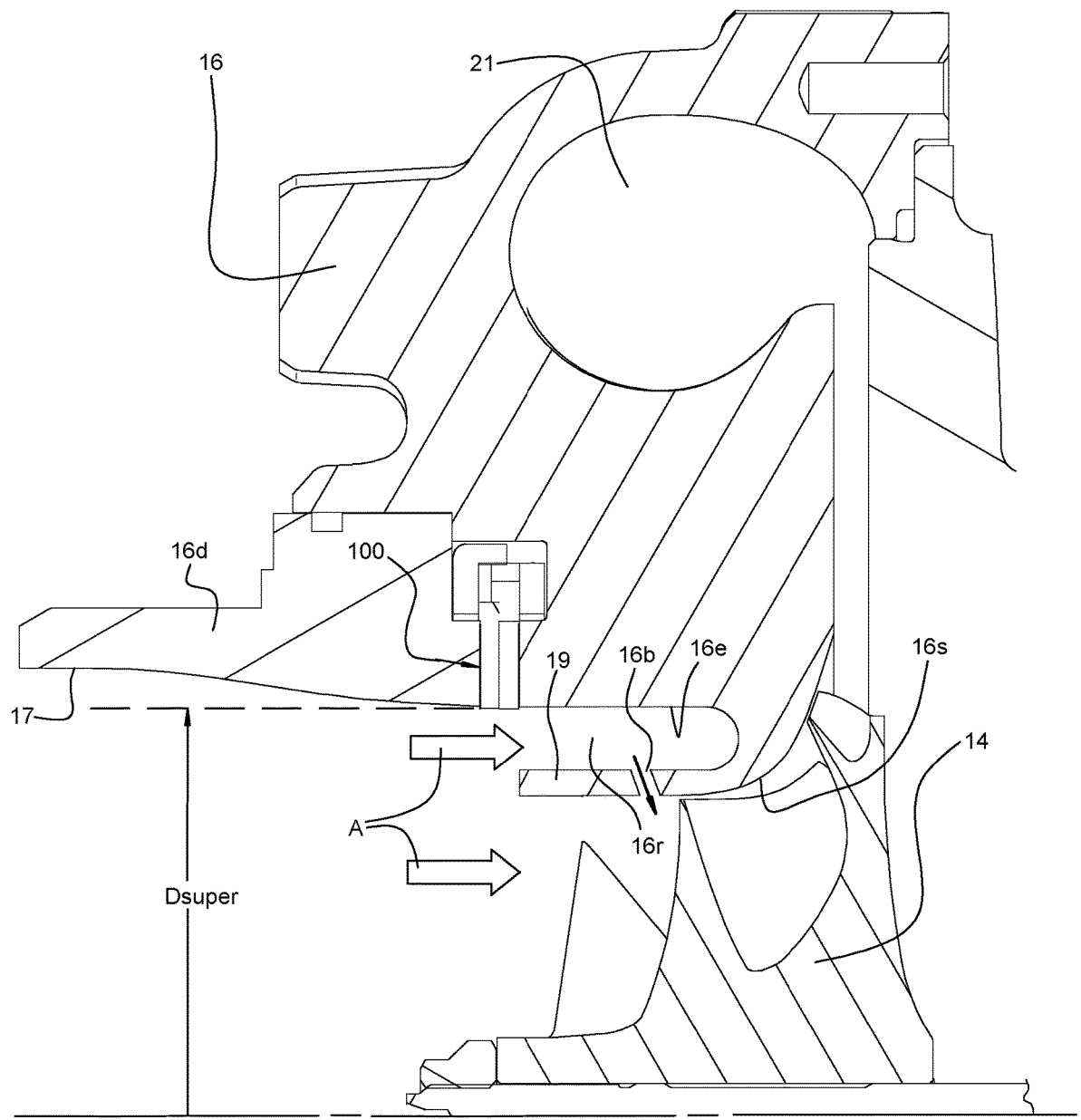
FIG. 4A is a view similar to FIG. 2A, with the inlet-adjustment mechanism in the super-open position.
Figure 7:
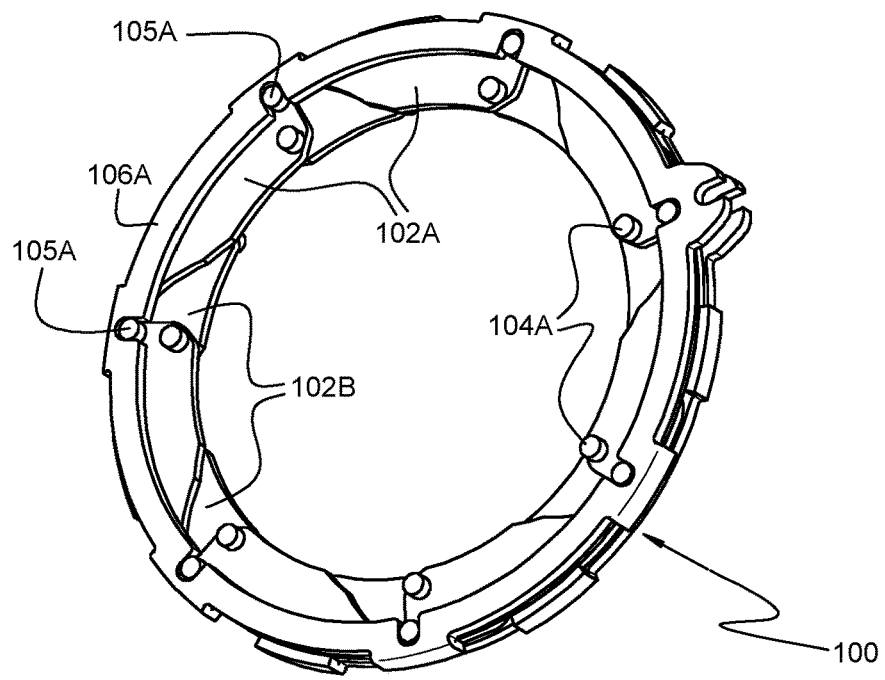
FIG. 7 is an isometric view of the inlet-adjustment mechanism in the super-open position.

FIG. 4A illustrates the inlet-adjustment mechanism in a "super-open" position (see also the corresponding axial end view in FIG. 4 and the isolated view of the mechanism in FIG. 7). In the super-open position, the blades 102A,B are moved further radially outwardly until they no longer block the opening into the annular space 16r of the ported shroud system. Therefore, the available flow area is further increased because air can flow both through the main flow path delimited by the inner wall 19, as well as through the annular space 16r of the ported shroud system and then inwardly through the bleed port 16b to the compressor wheel.

Figure 10:
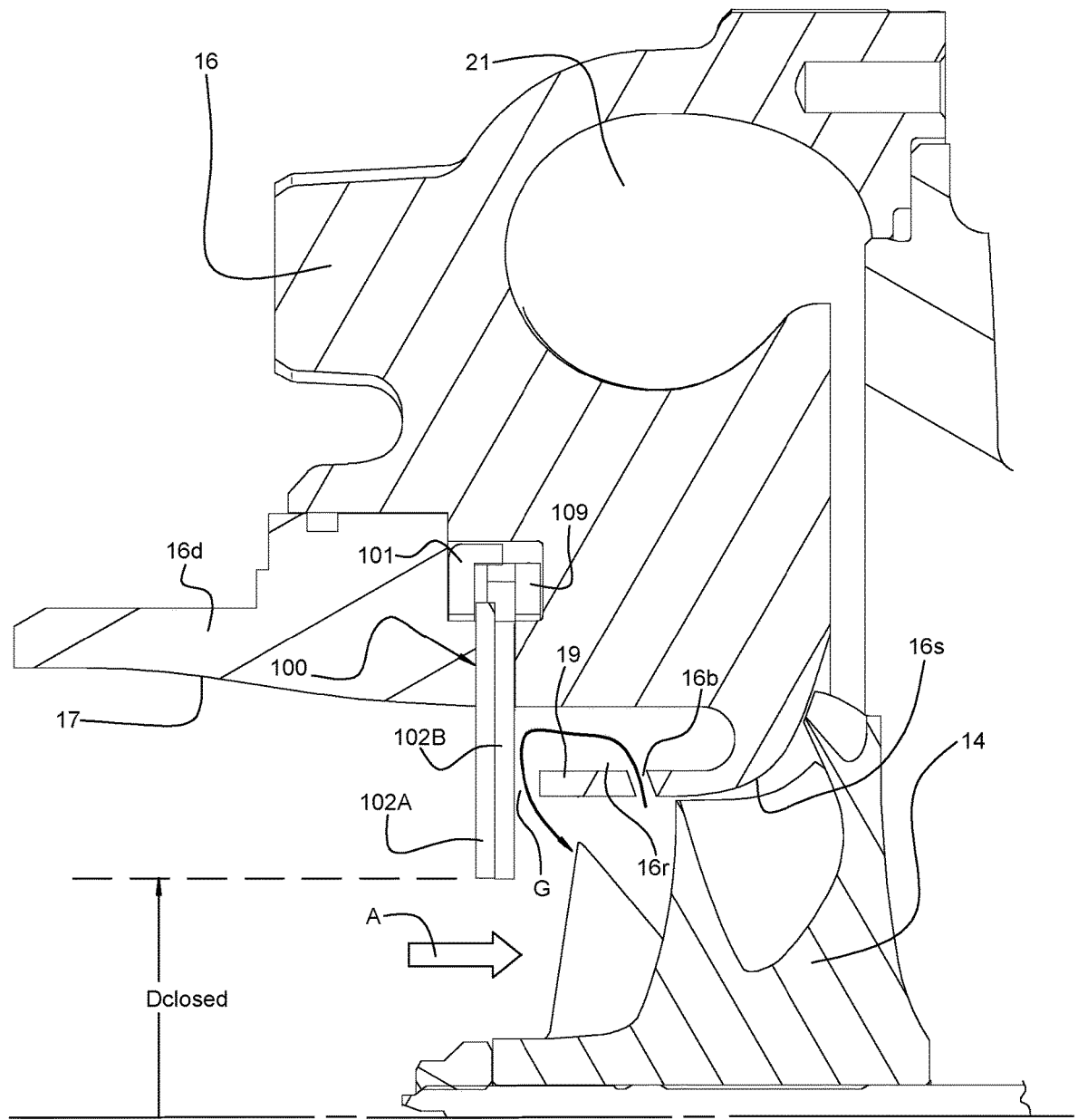
FIG. 10 is a view similar to FIG. 2A, showing an alternative embodiment of the invention.

FIG. 10 illustrates an alternative embodiment of the invention that is generally similar to the above-described embodiment in most respects. The chief difference is that in the embodiment of FIG. 10, the inner wall 19 is shortened in the axial direction such that there is an axial gap G between the upstream edge of the inner wall and the blades 102B of the inlet-adjustment mechanism when the mechanism is in the closed position as illustrated. This is effective for allowing a portion of the air bled off through the bleed port 16b into the annular space 16r to be recirculated through said axial gap G back into the air inlet. Such air recirculation is helpful for further reducing the likelihood of surge at low-flow operating conditions.

Figure 11:
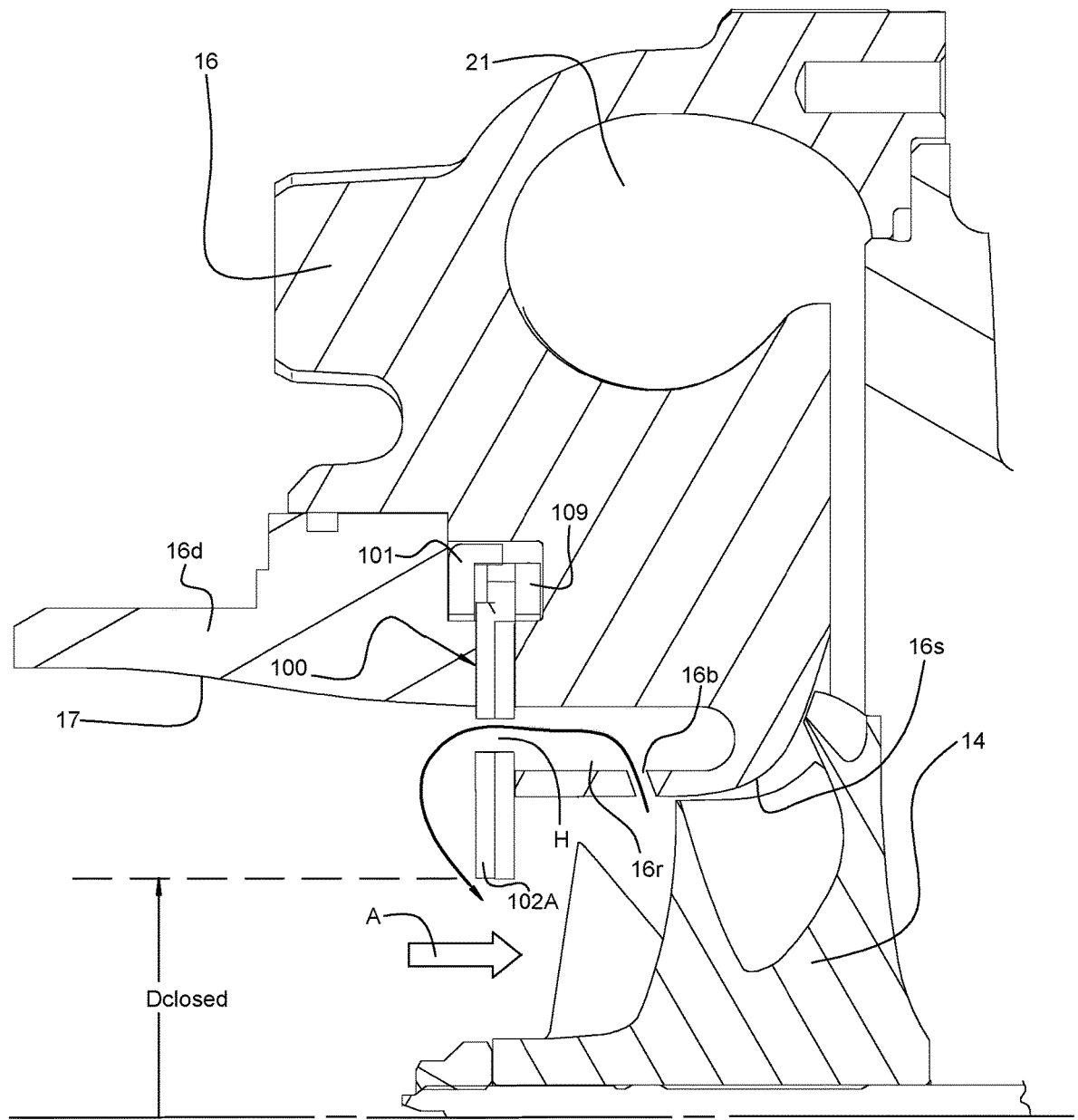
FIG. 11 is a view similar to FIG. 2A, showing yet another embodiment of the invention.

Yet another embodiment with a similar objective is depicted in FIG. 11. In this embodiment, instead of an axial gap, there are holes H defined through the blades 102A,B. Air from the annular space 16r can pass through the holes and be recirculated back into the air inlet. The holes are positioned such that when the inlet-adjustment mechanism is in the open or super-open positions, the holes are retracted radially outwardly into the space defined between the inlet duct member 16d and the compressor housing 16.

At low to intermediate flow rates (e.g., low to intermediate engine speeds), the inlet-adjustment mechanism 100 can be placed in the closed position (see FIGS. 1, 2A, 9, 10, and 11). This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At higher flow rates, the inlet-adjustment mechanism 100 can be placed in the open position of FIGS. 3, 3A, and 8. This can have the effect of increasing the effective inlet diameter so that the compressor regains its high-flow performance essentially as if the inlet-adjustment mechanism were not present and as if the compressor had a conventional inlet matched to the wheel diameter at the inducer portion of the wheel.

At high flow rates where choked flow may be encountered, the inlet-adjustment mechanism can be placed in the super-open position of FIGS. 4, 4A, and 7, thereby opening the ported shroud system so that the choke flow line is shifted to higher flow rates.

The invention is not limited to inlet-adjustment mechanisms having three positions (i.e., closed, open, and super-open). The mechanism can be adjusted to additional positions as desired (for example, one or more positions intermediate the closed and open positions, and/or one or more positions intermediate the open and super-open positions).

Many modifications and other embodiments of the inventions set forth herein will come to mind to one skilled in the art to which these inventions pertain having the benefit of the teachings presented in the foregoing descriptions and the associated drawings. For example, although the illustrated embodiment employs two sets of pivoting blades for the inlet-adjustment mechanism, the invention is not limited to any particular inlet-adjustment mechanism configuration. Any type of inlet-adjustment mechanism having blades or vanes or segments that can block flow into the ported shroud system in some positions and unblock the flow in other positions can be employed in the practice of the invention. The blades can translate radially inwardly and outwardly instead of pivoting, or can move both radially and circumferentially (i.e., helically). Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel defining an inducer portion, the compressor housing having an air inlet wall defining an air inlet for leading air generally axially into the compressor wheel, the compressor housing further defining a shroud surface that is adjacent to and follows a radially outer contour of the compressor wheel;
a compressor inlet-adjustment mechanism disposed in the air inlet of the compressor housing and movable between a closed position and a super-open position, the inlet-adjustment mechanism comprising a plurality of blades that are distributed about a circumference of the air inlet and that collectively form a ring that delimits an orifice, the blades being movable generally radially inwardly to define the closed position, and being movable generally radially outwardly to define the super-open position; and
wherein the compressor housing defines a ported shroud system comprising an inner wall forming an upstream extension of the shroud surface, and an outer wall spaced radially outwardly of the inner wall such that an annular space is defined between the inner and outer walls, and a bleed port formed through the inner wall and located adjacent the inducer portion of the compressor wheel for allowing air to pass between the annular space and the inducer portion, the inner wall extending upstream from the compressor wheel and terminating at an upstream edge, an opening into the annular space being defined between the outer wall and the upstream edge of the inner wall, wherein the blades of the inlet-adjustment mechanism are arranged such that in the closed position the blades block the opening into the annular space and prevent air flow into the annular space, the orifice in the closed position having a smaller diameter than that delimited by the inner wall, and in the super-open position the blades unblock the opening and allow air to flow into the annular space and through the bleed port into the compressor wheel.

2. The turbocharger of claim 1, wherein the inlet-adjustment mechanism is adjustable to an open position that is intermediate the closed and super-open positions and in which the blades still block the opening into the annular space, the orifice in the open position having a diameter approximately equal to that delimited by the inner wall.

3. The turbocharger of claim 2, wherein the blades are arranged to pivot between the closed, open, and super-open positions.

4. The turbocharger of claim 1, wherein an axial gap is defined between the blades and the upstream edge of the inner wall in the closed position of the inlet-adjustment mechanism, such that a portion of air is recirculated from the annular space through said axial gap back into the air inlet.

5. The turbocharger of claim 1, wherein the blades define holes therethrough, the holes being located such that in the closed position of the inlet-adjustment mechanism a portion of air is recirculated from the annular space through said holes back into the air inlet.

\* \* \* \* \*